United States Patent
Tomita et al.

(10) Patent No.: US 7,733,447 B2
(45) Date of Patent: Jun. 8, 2010

(54) LIQUID CRYSTAL DISPLAY DEVICE HAVING PARTICULAR GREEN CUT FILTER LAYER AND BLUE CUT FILTER LAYER

(75) Inventors: Junji Tomita, Kawasaki (JP); Masaki Nose, Kawasaki (JP); Tomohisa Shingai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 90 days.

(21) Appl. No.: 11/968,775

(22) Filed: Jan. 3, 2008

(65) Prior Publication Data
US 2008/0143941 A1    Jun. 19, 2008

Related U.S. Application Data

(63) Continuation of application No. PCT/JP2005/012351, filed on Jul. 4, 2005.

(51) Int. Cl.
*G02F 1/1335*    (2006.01)
(52) U.S. Cl. .................. 349/115; 349/113; 349/106
(58) Field of Classification Search .......... 349/115, 349/113, 108
See application file for complete search history.

(56) References Cited

U.S. PATENT DOCUMENTS 6,278,505 B1 *  8/2001  Okada et al. ............. 349/78
6,580,482 B1 *  6/2003  Hiji et al. ................. 349/115
6,806,924 B2 * 10/2004  Niiyama et al. .......... 349/72

FOREIGN PATENT DOCUMENTS

| JP | 10-31210 A | 2/1998 |
| JP | 2000-147547 A | 5/2000 |
| JP | 2001-66627 A | 3/2001 |
| JP | 2001-75121 A | 3/2001 |
| JP | 2001066627 A * | 3/2001 |
| JP | 2001075121 A * | 3/2001 |
| JP | 2001-109012 A | 4/2001 |
| JP | 2002-62540 A | 2/2002 |

OTHER PUBLICATIONS

International Search Report of PCT/JP2005/012351, date of mailing Aug. 9, 2005.

* cited by examiner

*Primary Examiner*—Mike Qi
(74) *Attorney, Agent, or Firm*—Westerman, Hattori, Daniels & Adrian, LLP

(57) ABSTRACT

A liquid crystal display device in which three cholesteric liquid crystal layers of selective reflection type are laminated, comprises: a first liquid crystal layer arranged on a device observation side selectively reflecting blue; a second liquid crystal layer arranged next to the first liquid crystal layer selectively reflecting green; a third liquid crystal layer arranged next to the second liquid crystal layer selectively reflecting red; and a green cut filter layer arranged between the green liquid crystal layer and the red liquid crystal layer selectively absorbing a light ray of a wavelength of 600 nm or less.

6 Claims, 8 Drawing Sheets

LIQUID CRYSTAL DISPLAY DEVICE HAVING PARTICULAR GREEN CUT FILTER LAYER AND BLUE CUT FILTER LAYER

CROSS-REFERENCE TO RELATED APPLICATION

This application is a continuation application and is based upon PCT/JP2005/12351, filed on Jul. 4, 2005.

BACKGROUND OF THE INVENTION

The present invention relates to a liquid crystal display device, and more specifically, to a liquid crystal display device in which three cholesteric liquid crystal display layers of selective reflection type are laminated.

Recently, the technical field of electronic paper that can maintain a display without a power supply and can be electrically rewritten has been rapidly developed. Electronic paper is aimed at realizing extremely low power consumption, capable of memory display even if the power supply is turned off, a reflective display gentle on the eye and which does not tire ones eyes, and a flexible, thin display device like paper. Applications for use in electronic books, electronic newspapers, electronic posters, etc., are being developed. As display systems, an electrophoresis system in which charged particles are moved in air or liquid, a twist ball system in which charged particles classified by two colors are rotated, and a bistable cholesteric liquid crystal system of a selective reflection-type that utilizes the interference reflection of a liquid crystal layer are being developed.

Among these various systems, the cholesteric liquid crystal system is overwhelmingly advantageous in producing a color display. In systems other than the cholesteric liquid crystal system, color filters classified by three colors need to be arranged for each pixel, and therefore, the brightness is ⅓ at the maximum, which corresponds to three divisions, and which are not practical. In the cholesteric liquid crystal system, colors are reflected by the interference of liquid crystals, and therefore, a color display can be produced just by lamination, and there is an advantage in that a brightness of nearly 50% or more can be obtained. A color display device that uses the cholesteric liquid crystal system is described in, for example, Japanese Unexamined Patent Publication (Kokai) No. 2002-116461.

FIG. 1A and FIG. 1B are diagrams explaining the principle of a display using cholesteric liquid crystals. As shown schematically, the panel has a configuration in which a liquid crystal layer 1 is sandwiched and held between transparent substrates 3 and 4. Substrate 3 is a substrate on the device observation side. On the surface outside substrate 4, a black light absorbing layer 5 is provided. The cholesteric liquid crystal has two stable states: one state in which layers are in parallel to the substrate surface; and another state in which layers are in the vertical direction. The two states can be switched electrically and are characterized by bistability by which the two states can be maintained without the supply of power.

As shown in FIG. 1A, when a high voltage is applied to an electrode (not shown) provided on substrates 3 and 4, the screw axes of liquid crystal molecules 2 linked spirally are oriented in the direction vertical to substrates 3 and 4 and a state is brought about in which layers are parallel to the substrate surface. This state is called a planar state. In the planar state, an interference reflection phenomenon occurs in accordance with the pitch of the layer, exhibiting a specific color and a reflective display is produced. This is a light state (reflective state). As shown in FIG. 1B, when low voltage is applied to the electrode provided on substrates 3 and 4, a state is brought about in which the screw axes of liquid crystal molecules 2 linked spirally are oriented in the direction parallel to substrates 3 and 4. This state is called a focal conic state. In the focal conic state, interference reflection does not occur, and therefore, light incident to the device is transmitted and absorbed by light absorbing layer 5 of substrate 4. This is a dark state (transmitting state). In the reflective state, the light that is not reflected is just transmitted through the liquid crystal layer, and it is therefore, possible to synthesize a reflective color by arranging liquid crystal layers that reflect different colors in the lower layer.

Because of interference reflection, the light reflected in the light state differs depending on the wavelength. Because of this, it is possible to obtain panels of reflected light from which exhibit red (R), green (G), and blue (B) by setting the screw pitch of the liquid crystal.

FIG. 2 is a diagram showing an outline of a color cholesteric liquid crystal display apparatus that has a color enabled display by laminating three panels. As shown schematically, in the order from the observation side, a blue (B) panel 10B, a green (G) panel 10G, and a red (R) panel 10R are laminated and thus a liquid crystal display device 9 is configured. A drive circuit 11 is connected to the electrode of each panel via flexible cables 12B, 12G, 12R. By applying voltage to the electrode of each panel from drive circuit 11, it is possible to bring a cell corresponding to the electrode of each panel into a light state and dark state and thus an image can be displayed. Each panel comprises a matrix electrode and can produce a dot matrix display.

FIG. 3 is a diagram showing a sectional view of liquid crystal display device 9 in FIG. 2. The electrode is not shown schematically. Each of panels 10B, 10G, 10R has a configuration in which each of liquid crystal layers 1B, 1G, 1R is sandwiched and held between transparent substrates 3 and 4 and the liquid crystal layer is sealed by a seal 6. Panels 10B, 10B, 10R are arranged in the order from the device observation side and panels 10B, 10G are bonded by a first adhesive layer 7 and panels 10G, 10R are bonded by a second adhesive layer 8. On the surface outside the substrate on the opposite side of the device observation side of panel 10R, black light absorbing layer 5 is provided. In the following explanation, panel 10B on the device observation side is referred to as a first (blue) panel and its liquid crystal layer 1B as a first (blue) liquid crystal layer, panel 10G next to the first panel is referred to as a second (green) panel and its liquid crystal layer 1G as a second (green) liquid crystal layer, and panel 10R next to the second panel is referred to as a third (red) panel and its liquid crystal layer 1R as a third (red) liquid crystal layer.

If first panel 10B is brought into a light (reflective) state and second and third panels 10G, 10R are brought into a dark (transmitting) state, a blue display is produced. Similarly, if second panel 10G is brought into a light (reflective) state and first and third panels 10B, 10R are brought into a dark (transmitting) state, a green display is produced, and if third panel 10R is brought into a light (reflective) state and first and second panels 10B, 10R are brought into a dark (transmitting) state, a red display is produced. Further, if first and second panels 10B, 10G are brought into the light (reflective) state and third panel 10R is brought into the dark (transmitting) state, a cyan display is produced, if second and third panels 10G, 10R are brought into the light (reflective) state and first panel 10B is brought into the dark (transmitting) state, a yellow display is produced, and if first and third panels 10B, 10R are brought into the light (reflective) state and second panel 10G is brought into the dark (transmitting) state, a magenta display is produced. If all of first to third panels 10B, 10G, 10R are brought into the light (reflective) state, a white display is produced and if all of first to third panels 10B, 10G, 10R are brought into the dark (transmitting) state, a black display is produced.

The selective reflection system of a cholesteric liquid crystal of lamination type has a problem of color purity of a red display. FIG. 4 is a diagram explaining the phenomenon of the drop in color purity due to the shift of the reflection wavelength band. The principle of the selective reflection of a cholesteric liquid crystal of lamination type is the interference reflection of a cholesteric liquid crystal in a multilayer state and the reflection wavelength band shifts depending on the angle of incident light to a liquid crystal display device from outside. With the increasing angle from the vertical incidence, the reflection wavelength band shifts toward the shorter wavelength side. Because the display device of reflection type uses light of the environment illumination, such as an electric lamp on site, light with a variety of angles enters the display device. Because of this, as shown in FIG. 4, in liquid crystal panel 10R set to a red display, the green on the shorter wavelength side is mixed in the display color. If green with high visual sensitivity mixes with red even slightly, the purity of red drops and red with a high purity cannot be displayed. Conventionally, coloring matter that absorbs green is mixed in third liquid crystal 1R of third red panel 10R so that green is not reflected in the panel structure in FIG. 3. Because this coloring matter absorbs and eliminates green which would produce noise, the purity of red is enhanced. However, if coloring matter is mixed in a liquid crystal, there arises a problem, such as deterioration of a liquid crystal, a rise in drive voltage, etc.

SUMMARY OF THE INVENTION

According to one aspect, there is a liquid crystal display device in which three cholesteric liquid crystal layers of selective reflection type are laminated, comprising: a first liquid crystal layer arranged on a device observation side selectively reflecting blue; a second liquid crystal layer arranged next to the first liquid crystal layer selectively reflecting green; a third liquid crystal layer arranged next to the second liquid crystal layer selectively reflecting red; and a green cut filter layer arranged between the green liquid crystal layer and the red liquid crystal layer selectively absorbing a light ray of a wavelength of 600 nm or less.

According to another aspect, there is electronic information terminal mounting the liquid crystal display device in which three cholesteric liquid crystal layers of selective reflection type are laminated, comprising: a first liquid crystal layer arranged on a device observation side selectively reflecting blue; a second liquid crystal layer arranged next to the first liquid crystal layer selectively reflecting green; a third liquid crystal layer arranged next to the second liquid crystal layer selectively reflecting red; and a green cut filter layer arranged between the green liquid crystal layer and the red liquid crystal layer selectively absorbing a light ray of a wavelength of 600 nm or less.

BRIEF DESCRIPTION OF THE DRAWINGS

The features and advantages of the color cholesteric liquid crystal display device will be more clearly understood from the following description taken in conjunction with accompanying drawings, in which.

DESCRIPTION OF THE PREFERRED EMBODIMENTS

Figure 1A:
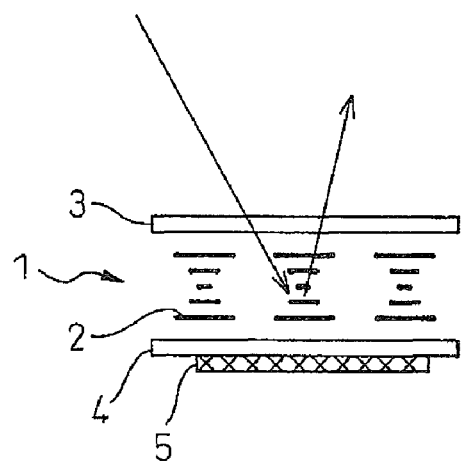
FIG. 1A is a diagram explaining the principle of a display by cholesteric liquid crystal.
Figure 1B:
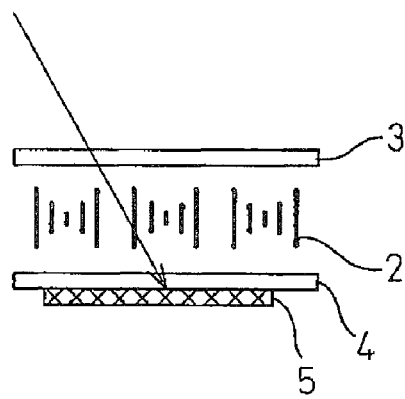
FIG. 1B is a diagram explaining the principle of a display by cholesteric liquid crystal.
Figure 2:
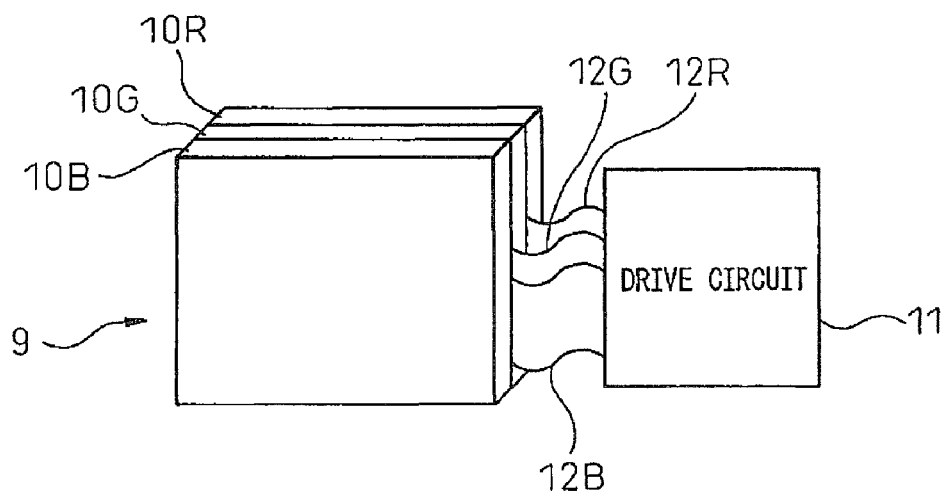
FIG. 2 is a diagram showing an outline of a color cholesteric liquid crystal display apparatus.
Figure 3:
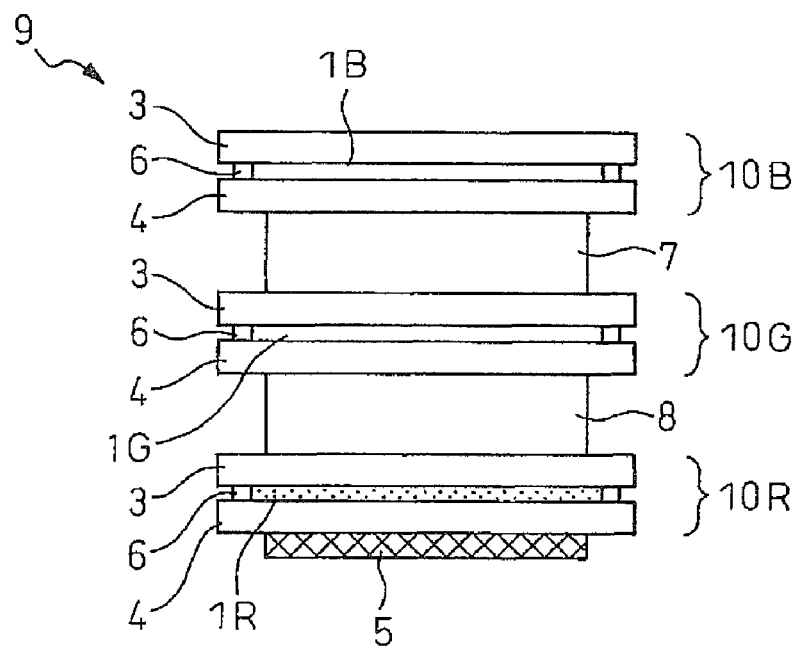
FIG. 3 is a diagram showing a panel structure of a conventional color cholesteric liquid crystal display device.
Figure 4:
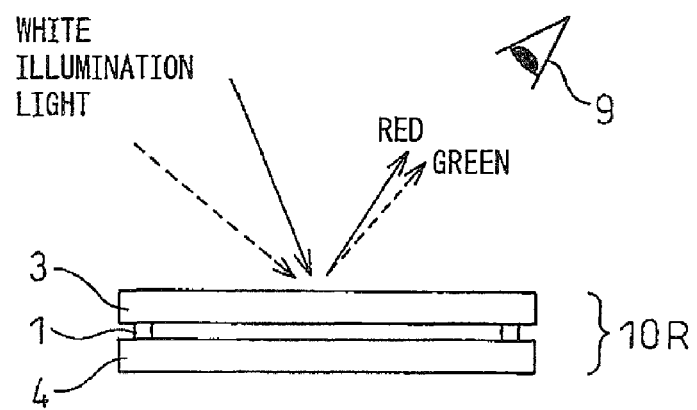
FIG. 4 is a diagram explaining the phenomenon of drop in color purity due to the shift of the reflection wavelength band in the cholesteric liquid crystal display device.
Figure 5:
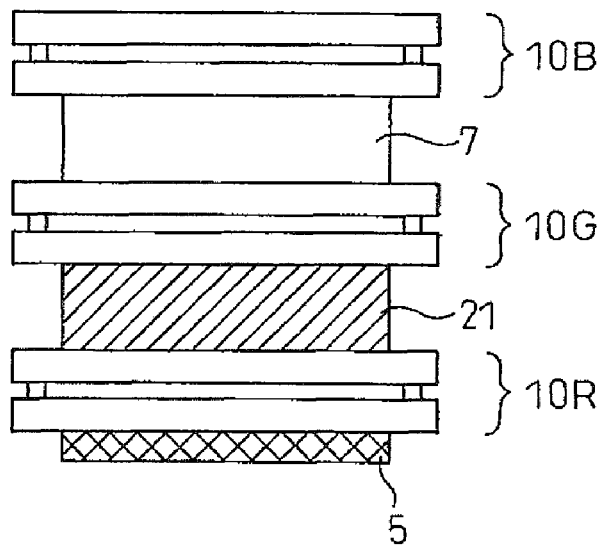
FIG. 5 is a diagram showing a panel structure of a color cholesteric liquid crystal display device in a first embodiment.

FIG. 5 is a diagram showing a panel structure of a color cholesteric liquid crystal display device in a first embodiment. The color cholesteric liquid crystal display device in the first embodiment is used in a color cholesteric liquid crystal display apparatus shown in FIG. 2. The color cholesteric liquid crystal display device in the first embodiment has a configuration similar to that in the conventional example in FIG. 3, but differs from the conventional example in that no coloring matter is mixed in third red liquid crystal layer 1R, color matter is mixed in a second adhesive layer 21 that bonds second green panel 10G and third red panel 10R, and second adhesive layer 21 functions as a green cut filter. Second adhesive layer 21 is formed from a material, which is an optically colorless, transparent adhesive material of photo-curing type in which dye or pigment is mixed, and the manufacturing process is the same as conventionally except in that an adhesive material mixed with dye or pigment is used, and it is not necessary to increase the number of processes. First adhesive layer 7 is formed from the same optically colorless, transparent adhesive material of photo-curing type as the conventional one.

Figure 6:
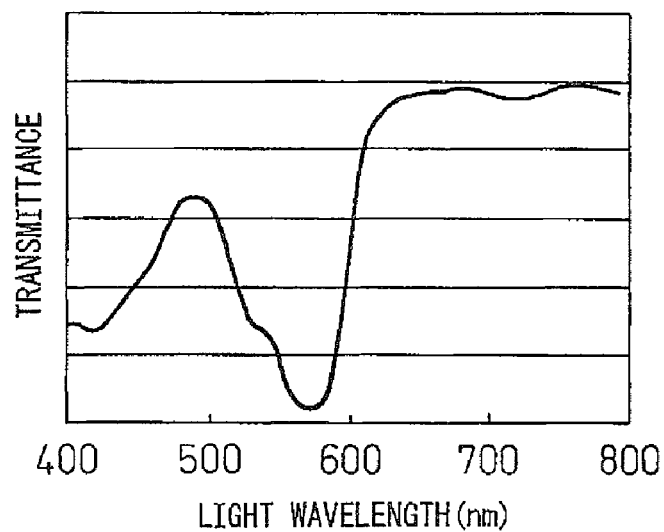
FIG. 6 is a diagram showing the spectral characteristic of a green cut filter used in the first embodiment.

FIG. 6 is a diagram showing the spectral characteristic of second adhesive layer 21 that functions as a green cut filter, showing the spectral transmittance. As shown schematically, the transmittance drops near 600 nm.

Figure 7:
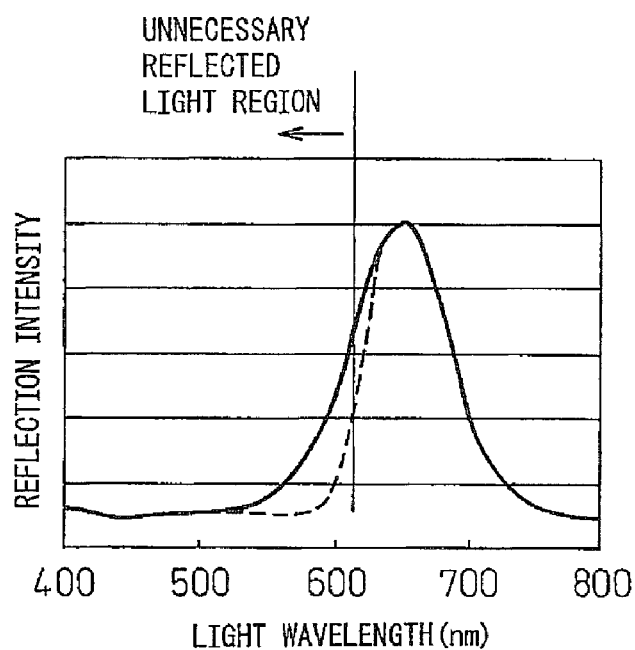
FIG. 7 is a diagram showing the reflection characteristic of the color cholesteric liquid crystal display device in the first embodiment.

FIG. 7 is a diagram showing the reflection characteristic of the color cholesteric liquid crystal display device in the first embodiment, also showing the spectral reflection characteristic of the device when only third red panel 10R is brought into the reflective state and first blue panel 10B and second green panel 10G are brought into the transmitting state in the device in the first embodiment, wherein the solid line represents the spectral reflection characteristic when second adhesive layer 21 is colorless and transparent, not having a function as a green cut filter, and the dotted line represents the spectral reflection characteristic in the first embodiment in which second adhesive layer 21 functions as a green cut filter. In second adhesive layer 21 that functions as a green cut filter, the transmittance drops near 600 nm as shown in FIG. 6, however, red has a high transmittance, and therefore, the reflection characteristic when third red panel 10R is brought into the reflective state, the green noise is removed; however, the brightness of the peak of red is not reduced, and thus, it is possible to enhance the color purity.

Figure 8:
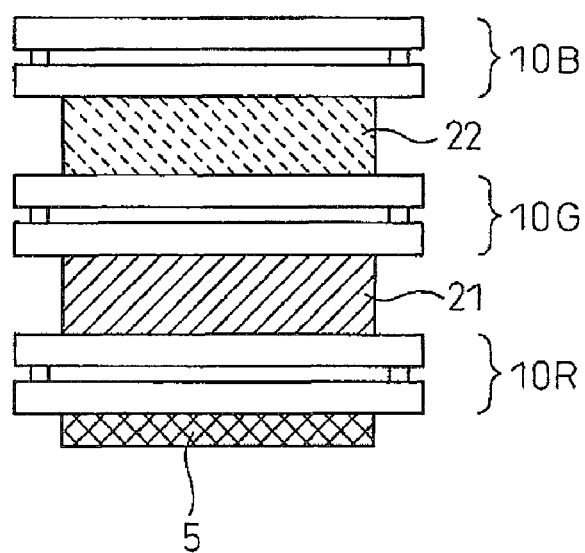
FIG. 8 is a diagram showing a panel structure of a color cholesteric liquid crystal display device in a second embodiment.

FIG. 8 is a diagram showing a panel structure of a color cholesteric liquid crystal display device in a second embodiment. The color cholesteric liquid crystal display device in the second embodiment is also used in the color cholesteric liquid crystal display apparatus shown in FIG. 2. The color cholesteric liquid crystal display device in the second embodiment has a configuration similar to that of the color cholesteric liquid crystal display device in the first embodiment in FIG. 5 and other configurations are the same except in that coloring matter is mixed in a first adhesive layer 22 that bonds first blue panel 10B and second green panel 10G and first adhesive layer 22 functions as a blue cut filter.

Figure 9:
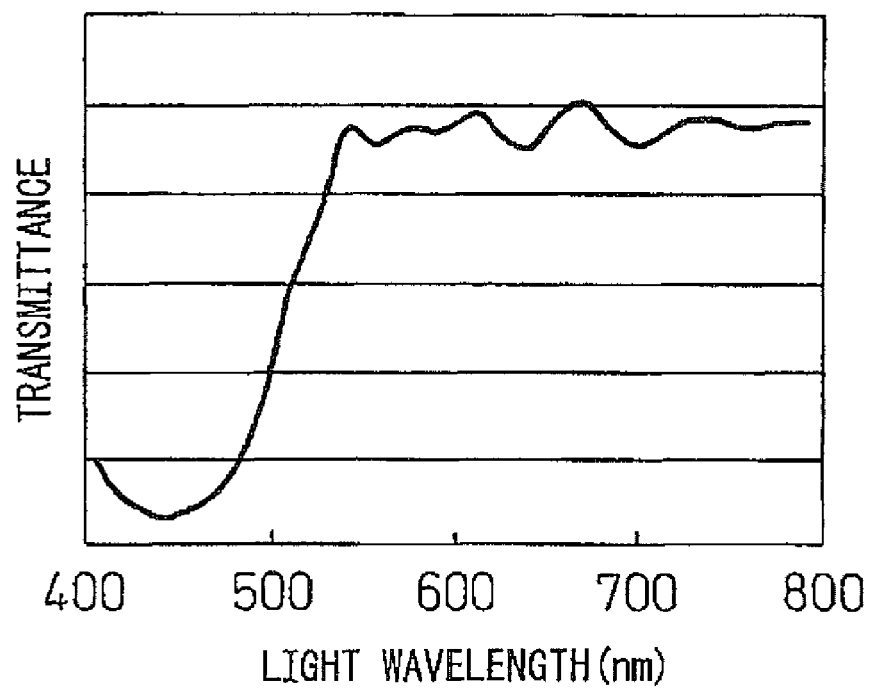
FIG. 9 is a diagram showing the spectral characteristic of a blue cut filter used in the second embodiment.

FIG. 9 is a diagram showing the spectral characteristic of first adhesive layer 22 that functions as a blue cut filter, showing the spectral transmittance. As shown schematically, the transmittance of blue is low and blue light is attenuated. Similar to second adhesive layer 21 in the first embodiment, first adhesive layer 22 is formed from a material, which is an optically colorless, transparent adhesive material of photocuring type in which dye or pigment is mixed.

Figure 10A:
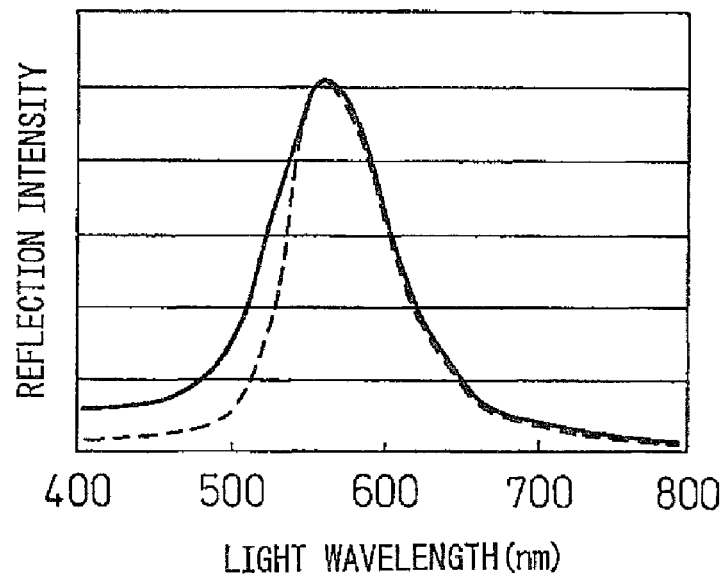
FIG. 10A is a diagram showing the reflection characteristic (when only the green panel is brought into the light state) of the color cholesteric liquid crystal display device in the second embodiment.
Figure 10B:
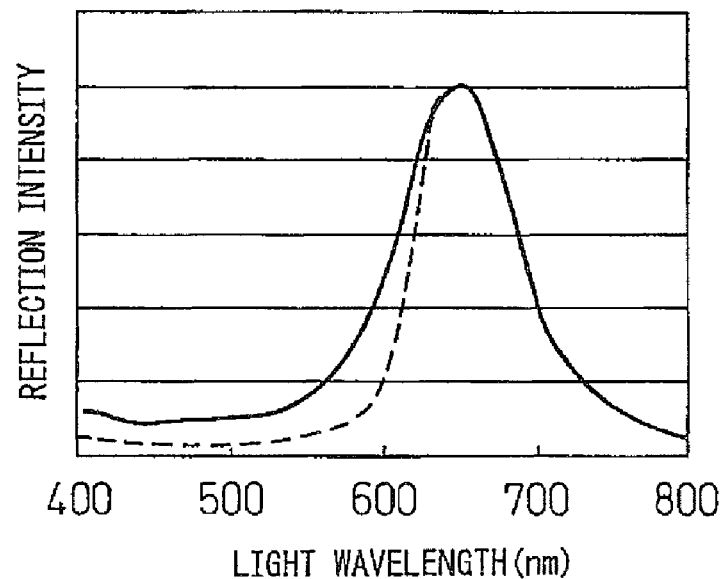
FIG. 10B is a diagram showing the reflection characteristic (when only the red panel is brought into the light state) of the color cholesteric liquid crystal display device in the second embodiment.

FIG. 10A and FIG. 10B are diagrams showing the reflection characteristic of the color cholesteric liquid crystal display device in the second embodiment. FIG. 10A shows the spectral reflection characteristic of the device when only second green panel 10G is brought into the reflective state and first blue panel 10B and third red panel 10R are brought into the transmitting state in the device in the second embodiment. FIG. 11B shows the spectral reflection characteristic of the device when only third red panel 10R is brought into the reflective state and first blue panel 10B and second green panel 10R are brought into the transmitting state in the device in the second embodiment. In FIG. 10A and FIG. 10B, the solid line represents the spectral reflection characteristic when first adhesive layer 22 and second adhesive layer 21 are colorless and transparent, not having the functions as a blue cut filter and a green cut (eliminating) filter, respectively, and the dotted line represents the spectral reflection characteristic in the second embodiment when first adhesive layer 22 and second adhesive layer 21 have the functions as a blue cut filter and a green cut filter, respectively.

As described above, due to the principle of interference reflection of the cholesteric liquid crystal, the green noise with high visual sensitivity mixes with the red display and the color purity of the red display is reduced, and in the first embodiment, the green noise light is removed and the color purity of the red display is improved; however, the blue noise is also mixedly in the green display in principle. However, even if a small amount of the blue noise with low visual sensitivity is mixedly in the green with high visual sensitivity, the reduction in color purity is not recognized visually, and conventionally it has not been thought that a structure that cuts the noise is necessary. However, in the yellow display, in which the color is a combination of red and green of the combined reflected light of third red panel 10R and second green panel 10G, it has been found that the color purity of yellow is reduced considerably due to the blue noise included in the reflected light of second green panel 10G.

In the color cholesteric liquid crystal display device in the second embodiment, because second adhesive layer 22 functions as a blue cut filter, the blue noise is removed when the green display is produced and the color purity of yellow is improved.

When second adhesive layer 22 functions as a blue cut filter, the blue wavelength band in third red panel 10R is also removed. In the cholesteric liquid crystal display device, whitish noise of a liquid crystal material is included in addition to the noise due to the interference principle. The noise is one of the factors that reduces color purity. In the reflection characteristic of the red display when only third red panel 10R shown in FIG. 10B is brought into the reflective state, the noise in the blue wavelength band is also cut as shown by the dotted line. From the comparison with the characteristic represented by the dotted line in FIG. 7, it can be seen that the characteristic is that the color purity of red is improved. As described above, in the color cholesteric liquid crystal display device in the second embodiment, the color purity is further improved.

For the spectral transmittance of the green cut filter shown in FIG. 6, a color material that also cuts the blue band may be used; however, it is necessary to mix a plurality of kinds of pigment or dye in the color material in order to widen the band of the absorption wavelength of light to be cut. When the color material content increases, the wavelength band that is desired to not be cut (eliminated) may be affected. In addition, there may be a case where the coloring material itself scatters to become noise light, and from this standpoint also, the configuration in the second embodiment in which the band to be cut is separated is desirable. A black display in the cholesteric liquid crystal display system is produced by bringing the first to third panels into the transparent state and absorbing incident light by black light absorbing layer 5 in the lowest layer. Because of this, the scattered light that occurs in the device becomes display light without reaching light absorbing layer 5 in the lowest layer, and therefore, the black concentration is reduced and the contrast of the display is deteriorated. The scattered light of the coloring material also becomes the deterioration factor of the display. Pigment is composed of particles and its scattered light is strong. Dye is composed molecules and is excellent in transparency. Because of this, it is desirable to use a dye base. In addition, because the adhesive layer to be laminated prevents deterioration of liquid crystals, an adhesive material of a visible light curing-type is desirable.

Figure 11A:
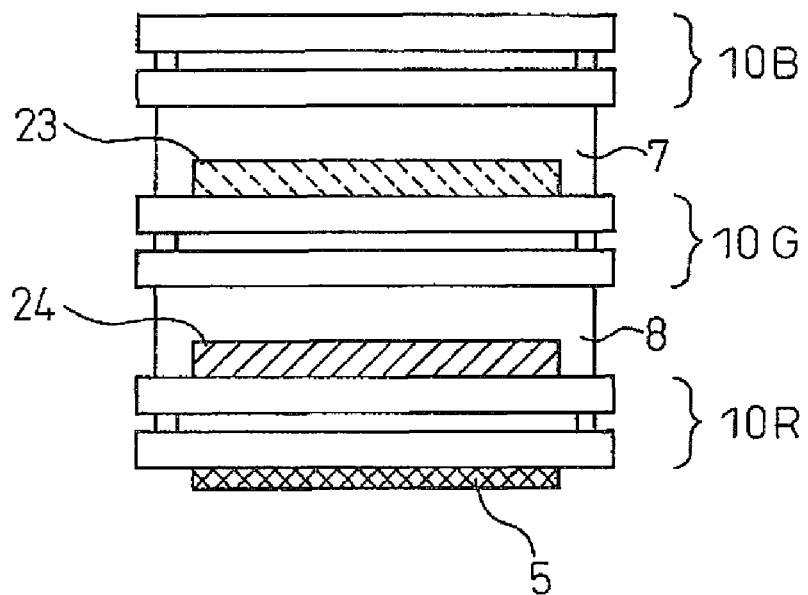
FIG. 11A is a diagram showing a panel structure of a color cholesteric liquid crystal display device in a third embodiment.
Figure 11B:
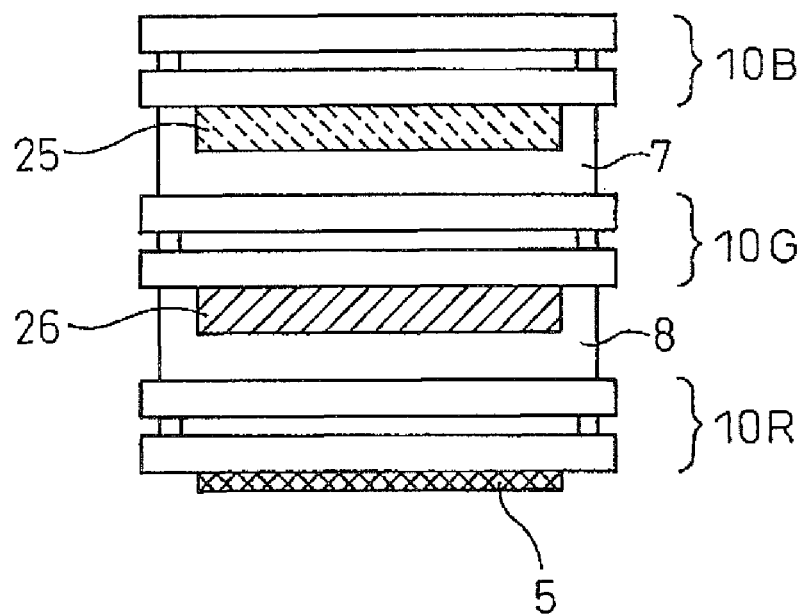
FIG. 11B is a diagram showing a modification example of a panel structure of the color cholesteric liquid crystal display device in the third embodiment.

FIG. 11A is a diagram showing a panel structure of a color cholesteric liquid crystal display device in a third embodiment. The color cholesteric liquid crystal display device in the third embodiment is also used in the color cholesteric liquid crystal display apparatus shown in FIG. 2. The color cholesteric liquid crystal display device in the third embodiment has a configuration similar to that of the color cholesteric liquid crystal display device in the second embodiment in FIG. 8 and other configurations are the same, except for the following points that differ from those in the second embodiment. In the second embodiment, first adhesive layer 22 functions as a blue cut filter and second adhesive layer 21 functions as a green cut filter, however, in the third embodiment, first and second adhesive layers 7, 8 are colorless, transparent adhesive materials of photo-curing type. Then, in the third embodiment, a blue cut filter layer 23 is formed on the surface outside the substrate on the device observation side of second green panel 10G and a green cut filter layer 24 is formed on the surface outside the substrate on the device observation side of third red panel 10R. In addition, similar to the second embodiment, light absorbing layer 5 is formed on the surface outside the substrate on the opposite side of the device observation side of third red panel 10R. After blue cut filter layer 23 is formed on second green panel 10G and green cut filter layer 24 and light absorbing layer 5 are formed on third red panel 10R, first to third panels 10B to 10R are bonded by adhesive layers 7 and 8 and then laminated.

In the first and second embodiments, the first and second adhesive layers are mixed with a coloring material and caused to function as blue and green cut filters. Due to this, there is an advantage that it is not necessary to increase the number of manufacturing processes, however, in order to obtain an accurate spectral transmittance, it is required that the thickness of the adhesive layer be a predetermined value and uniform. Because of this, there arises a problem in that the color characteristic changes due to the variations in the thickness of adhesive layer or the control of the thickness of layer in the manufacturing process becomes difficult. In contrast to this, with the panel structure in the third embodiment, it is possible to uniformly form filter layers 23, 24 by a printing method, etc., and then bond them, and therefore, a uniform optical characteristic can be easily realized.

FIG. 11B is a diagram showing a modification example of the panel structure in the third embodiment. In this modification example, after a blue cut filter 25 is formed on the surface outside the substrate on the opposite side of the device observation side of first blue panel 10B, a green cut filter layer 26 is formed on the surface outside the substrate on the opposite side of the device observation side of second green panel 10G, and black light absorbing layer 5 is formed on the surface outside the substrate on the opposite side of the device observation side of third red panel 10R, the three panels are laminated with adhesive layers 7, 8. In this modification example, the configuration is such that a film is formed on each of the three panels and the three panels can be processed in one step, respectively, and therefore, production efficiency is high.

Figure 12A:
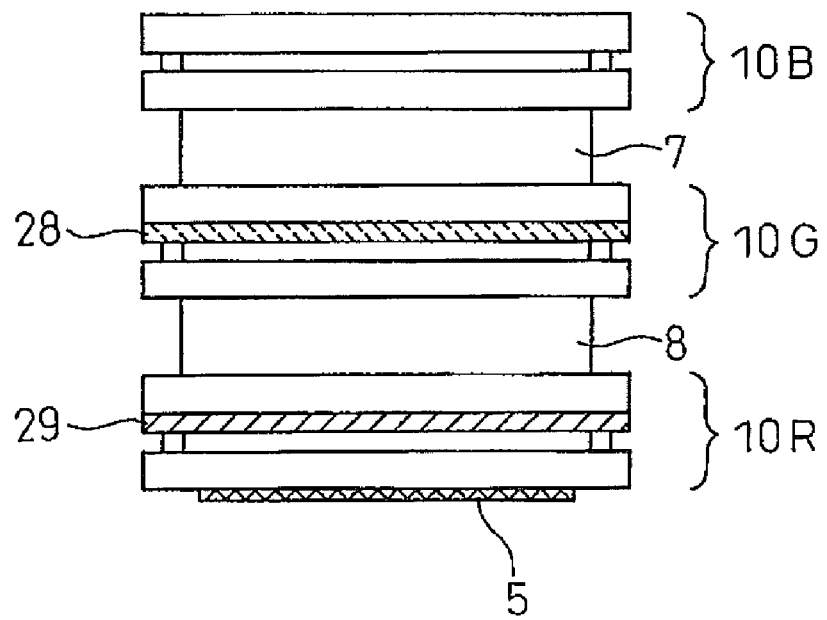
FIG. 12A is a diagram showing a panel structure of a color cholesteric liquid crystal display device in a fourth embodiment.

FIG. 12A is a diagram showing a panel structure of a color cholesteric liquid crystal display device in a fourth embodiment. The color cholesteric liquid crystal display device in the fourth embodiment is also used in the color cholesteric liquid crystal display apparatus shown in FIG. 2. The color cholesteric liquid crystal display device in the fourth embodiment has a configuration similar to that of the color cholesteric liquid crystal display device in the third embodiment in FIG. 11A and other configurations are the same except for the following points that differ from those in the third embodiment. In the third embodiment, blue cut filter layer 23 and green cut filter layer 24 are formed on the surface outside the substrates of second green panel 10G and third red panel 10R. In contrast to this, in the fourth embodiment, the structure is such that, as shown in FIG. 12A, a blue cut filter layer 28 is formed on the inner surface of the substrate on the device observation side of second green panel 10G, a green cut filter layer 29 is formed on the inner surface of the substrate on the device observation side of third red panel 10R, black light absorbing layer 5 is formed on the outer surface of the substrate not on the device observation side of third red panel 10R, and then three panels 10B to 10R are bonded and laminated. Black light absorbing layer 5 may be formed on the inner side of the substrate not on the device observation side of third red panel 10R.

In the panel structure in the fourth embodiment, because blue cut filter layer 28 and green cut filter layer 29 are formed inside the panel, it is possible to prevent damage to the filter layer in the process for manufacturing the panel, and thus, the yield is improved.

It is desirable for the electrodes of second green panel 10G and third red panel 10R to be formed on blue cut filter layer 28 and green cut filter layer 29 in order to apply a voltage to the liquid crystal with efficiency.

Figure 12B:
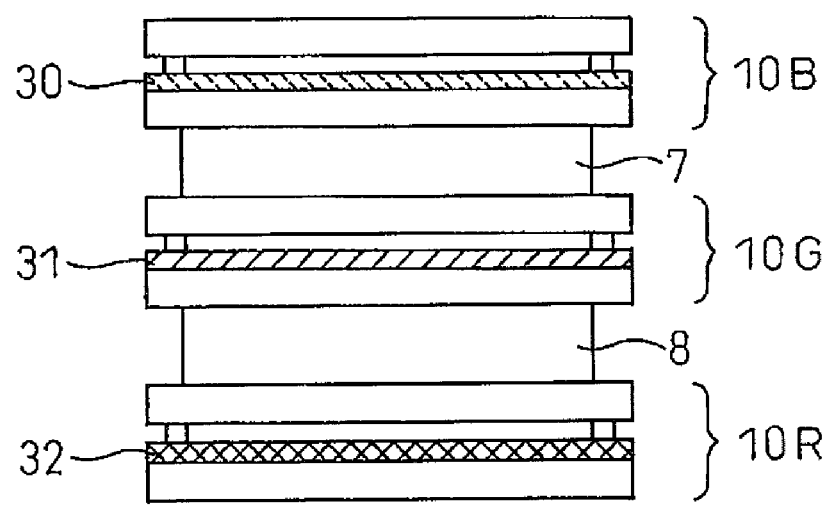
FIG. 12B is a diagram showing a modification example of a panel structure of the color cholesteric liquid crystal display device in the fourth embodiment.

FIG. 12B is a diagram showing a modification example of the panel structure in the fourth embodiment. In this modification example, after a blue cut filter layer 30 is formed on the inner surface of the substrate not on the device observation side of first blue panel 10B, a green cut filter layer 31 is formed on the inner surface of the substrate not on the device observation side of second green panel 10G, and black light absorbing layer 5 is formed on the outer surface of the substrate not on the device observation side of third red panel 10R, the three panels are laminated with adhesive layers 7, 8. In this modification example, the configuration is such that a film is formed on each of the three panels and the three panels can be processed in one step, respectively, and therefore, production efficiency is high.

In this modification example also, it is desirable for the electrodes of first blue panel 10B, second green panel 10G, and third red panel 10R to be formed on blue cut filter layer 30, green cut filter layer 31, and a light absorbing layer 32 in order to apply a voltage to the liquid crystal with efficiency.

In the third and fourth embodiments and their modification examples, the color cut filter layer is formed on the substrate surface, however, it may also be possible to mix a coloring material in the substrate itself and cause the substrate to function as a color cut filter layer. If the substrate itself is mixed with a color material, the process for forming a film can be omitted and the improvement of mass-productivity can be expected.

As described above, the panel structure in the embodiments is characterized by the arrangement of a coloring material in the lamination structure. In addition, the color filter used in the conventional STN liquid crystal, TFT liquid crystal, etc., is a band pass filter that exhibits a display color; however, in the lamination color system in the cholesteric liquid crystal with above mentioned structure, the liquid crystal is in charge of the basic display colors and the color filter is a notch filter that cuts a narrow wavelength band, and the color filter removes noise. Due to the present invention that proposes this filter configuration, it is possible to provide a display device excellent in color purity, color reproductivity, and mass-productivity.

In addition, as the substrate that constitutes the panel in the embodiments, a glass substrate or a plastic substrate can be used.

We claim:

1. A liquid crystal display device in which three cholesteric liquid crystal layers of selective reflection type are laminated, comprising:
   a first cholesteric liquid crystal layer arranged on a device observation side selectively reflecting blue;
   a second cholesteric liquid crystal layer arranged next to the first cholesteric liquid crystal layer selectively reflecting green;

a third cholesteric liquid crystal layer arranged next to the second cholesteric liquid crystal layer selectively reflecting red;

a green cut filter layer arranged between the second cholesteric liquid crystal layer and the third cholesteric liquid crystal layer selectively absorbing a light ray having a wavelength of 600 nm or less; and a blue cut filter layer arranged between the first cholesteric liquid crystal layer and the second cholesteric liquid crystal layer selectively absorbing a light ray having a wavelength of 520 nm or less, wherein:

each liquid crystal layer is sandwiched by two substrates, and the two substrates and the each liquid crystal layer constitute a panel; and the liquid crystal display device comprises two adhesive layers that bond a plurality of panels;

wherein at least one of the green cut filter layer and the blue cut filter layer is formed on the liquid crystal layer side of the substrate of the panel and the electrode is formed on at least one of the green cut filter layer and the blue cut filter layer.

2. The liquid crystal display device according to claim 1, wherein the plurality of panels include a first panel having the first cholesteric liquid crystal layer, a second panel having the second cholesteric liquid crystal layer, and a third panel having the third cholesteric liquid crystal layer;

the blue cut filter layer is provided on the liquid crystal layer side of the substrate on the opposite side of the device observation side of the first panel;

the green cut filter layer is provided on the liquid crystal layer side of the substrate on the opposite side of the device observation side of the second panel; and a black light absorbing layer is provided on the liquid crystal layer side of the surface on the opposite side of the device observation side of the third panel.

3. The liquid crystal display device according to claim 1, wherein coloring materials that exhibit colors of the green cut filter layer and the blue cut filter layer are dye or pigment.

4. An electronic information terminal mounting a liquid crystal display device in which three cholesteric liquid crystal layers of selective reflection type are laminated, comprising:

a first cholesteric liquid crystal layer arranged on a device observation side selectively reflecting blue;

a second cholesteric liquid crystal layer arranged next to the first cholesteric liquid crystal layer selectively reflecting green;

a third cholesteric liquid crystal layer arranged next to the second cholesteric liquid crystal layer selectively reflecting red;

a green cut filter layer arranged between the second cholesteric liquid crystal layer and the third cholesteric liquid crystal layer selectively absorbing a light ray having a wavelength of 600 nm or less; and a blue cut filter layer arranged between the first cholesteric liquid crystal layer and the second cholesteric liquid crystal layer selectively absorbing a light ray having a wavelength of 520 nm or less, wherein:

each liquid crystal layer is sandwiched by two substrates, and the two substrates and the each liquid crystal layer constitute a panel; and the liquid crystal display device comprises two adhesive layers that bond a plurality of panels;

wherein at least one of the green cut filter layer and the blue cut filter layer is formed on the liquid crystal layer side of the substrate of the panel and an electrode is formed on at least one of the green cut filter layer and the blue cut filter layer.

5. The electronic information terminal according to claim 4, wherein the plurality of panels include a first panel having the first cholesteric liquid crystal layer, a second panel having the second cholesteric liquid crystal layer, and a third panel having the third cholesteric liquid crystal layer;

the blue cut filter layer is provided on the liquid crystal layer side of the substrate on the opposite side of the device observation side of the first panel;

the green cut filter layer is provided on the liquid crystal layer side of the substrate on the opposite side of the device observation side of the second panel; and a black light absorbing layer is provided on the liquid crystal layer side of the surface on the opposite side of the device observation side of the third panel.

6. The electronic information terminal according to claim 4, wherein coloring materials that exhibit colors of the green cut filter layer and the blue cut filter layer are dye or pigment.

* * * * *